(12) United States Patent
Chang et al.

(10) Patent No.: US 11,309,542 B2
(45) Date of Patent: Apr. 19, 2022

(54) NICKEL-BASED ACTIVE MATERIAL FOR LITHIUM SECONDARY BATTERY, PREPARING METHOD THEREOF, AND LITHIUM SECONDARY BATTERY INCLUDING POSITIVE ELECTRODE INCLUDING THE SAME

(71) Applicant: Samsung SDI Co., Ltd., Yongin-si (KR)

(72) Inventors: Donggyu Chang, Yongin-si (KR); Jongmin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 146 days.

(21) Appl. No.: 15/836,311

(22) Filed: Dec. 8, 2017

(65) Prior Publication Data

US 2018/0166687 A1    Jun. 14, 2018

(30) Foreign Application Priority Data

Dec. 8, 2016  (KR) .................. 10-2016-0166888
Dec. 7, 2017  (KR) .................. 10-2017-0167526

(51) Int. Cl.
*H01M 4/131*    (2010.01)
*H01M 4/1391*   (2010.01)
(Continued)

(52) U.S. Cl.
CPC ............ *H01M 4/505* (2013.01); *C01G 53/42* (2013.01); *C01G 53/50* (2013.01); *C01G 53/66* (2013.01);
(Continued)

(58) Field of Classification Search
CPC .. C01P 2006/10; C01P 2006/16; C01G 53/42; C01G 53/50; C01G 53/66;
(Continued)

(56) References Cited

U.S. PATENT DOCUMENTS 8,486,564 B2  7/2013  Nagai et al.
8,728,666 B2  5/2014  Itou et al.
(Continued)

FOREIGN PATENT DOCUMENTS

CN   101002351 A   7/2007
CN   101167209 A   4/2008
(Continued)

OTHER PUBLICATIONS

EPO Extended Search Report dated Mar. 29, 2018, corresponding to European Patent Application No. 17206091.5 (7 pages).
(Continued)

*Primary Examiner* — Brittany L Raymond
(74) *Attorney, Agent, or Firm* — Lewis Roca Rothgerber Christie LLP (57) ABSTRACT

A nickel-based active material for a lithium secondary battery includes a porous inner portion having closed pores and an outer portion, wherein the porous inner portion has a density less than that of the outer portion, and the nickel-based active material has a net density of 4.7 g/cc or less. A method of preparing the same, and a lithium secondary battery including a positive electrode including the nickel-based active material are provided.

18 Claims, 7 Drawing Sheets

(51) Int. Cl.
   *H01M 4/505*   (2010.01)
   *H01M 4/525*   (2010.01)
   *H01M 10/052*  (2010.01)
   *C01G 53/00*   (2006.01)
   *H01M 50/107*  (2021.01)
   *H01M 4/02*    (2006.01)

(52) U.S. Cl.
   CPC ......... *H01M 4/131* (2013.01); *H01M 4/1391* (2013.01); *H01M 4/525* (2013.01); *H01M 50/107* (2021.01); *C01P 2006/10* (2013.01); *C01P 2006/16* (2013.01); *H01M 10/052* (2013.01); *H01M 2004/028* (2013.01)

(58) Field of Classification Search
   CPC ............... H01M 2/022; H01M 10/052; H01M 2004/028; H01M 4/131; H01M 4/505; H01M 4/525
   See application file for complete search history.

(56) References Cited

U.S. PATENT DOCUMENTS

| | | |
|---|---|---|
| 9,337,487 B2 | 5/2016 | Sun et al. |
| 9,450,229 B2 | 9/2016 | Uwai et al. |
| 9,559,351 B2 | 1/2017 | Mori et al. |
| 9,577,254 B2 | 2/2017 | Nagai |
| 9,601,770 B2 | 3/2017 | Park et al. |
| 9,899,674 B2 | 2/2018 | Hirai et al. |
| 10,020,507 B2 | 7/2018 | Kobayashi et al. |
| 10,396,356 B2 | 8/2019 | Toya et al. |
| 10,833,329 B2 | 11/2020 | Kim et al. |
| 2009/0029253 A1 | 1/2009 | Itou et al. |
| 2012/0231322 A1 | 9/2012 | Chu et al. |
| 2013/0045421 A1 | 2/2013 | Kobino et al. |
| 2014/0087265 A1 | 3/2014 | Yura et al. |
| 2014/0205898 A1 | 7/2014 | Lee et al. |
| 2014/0335417 A1 | 11/2014 | Nagai |
| 2015/0064557 A1 | 3/2015 | Kim et al. |
| 2015/0086787 A1* | 3/2015 | Yura ................. H01M 4/131 428/403 |
| 2015/0093580 A1 | 4/2015 | Kobayashi et al. |
| 2016/0036041 A1* | 2/2016 | Uwai .................. H01M 4/131 429/223 |
| 2016/0079597 A1 | 3/2016 | Fujiki et al. |
| 2016/0181597 A1 | 6/2016 | Kim et al. |
| 2016/0190573 A1 | 6/2016 | Sun et al. |
| 2017/0222221 A1 | 8/2017 | Park et al. |
| 2017/0352885 A1 | 12/2017 | Kondo et al. |
| 2018/0026267 A1 | 1/2018 | Kim et al. |
| 2018/0026268 A1 | 1/2018 | Kim et al. |
| 2018/0108940 A1 | 4/2018 | Kwon et al. |
| 2018/0219216 A1 | 8/2018 | Choi et al. |
| 2019/0148721 A1 | 5/2019 | Park et al. |
| 2019/0173076 A1 | 6/2019 | Kim et al. |
| 2020/0028168 A1 | 1/2020 | Ju et al. |
| 2020/0185709 A1 | 6/2020 | Zhou et al. |
| 2020/0185714 A1 | 6/2020 | Han et al. |

FOREIGN PATENT DOCUMENTS

| | | |
|---|---|---|
| CN | 102576873 A | 7/2012 |
| CN | 104303345 A | 1/2015 |
| CN | 104521039 A | 4/2015 |
| CN | 105051952 A | 11/2015 |
| CN | 105070896 A | 11/2015 |
| CN | 105453311 A | 3/2016 |
| EP | 2882013 A1 | 6/2015 |
| EP | 2975680 A1 | 1/2016 |
| EP | 3272710 A1 | 1/2018 |
| EP | 3734720 A1 | 11/2020 |
| JP | 2001-243951 A | 9/2001 |
| JP | 2012-254889 A | 12/2012 |
| JP | 2013-118156 A | 6/2013 |
| JP | 2013-206556 A | 10/2013 |
| JP | 2014-67645 A | 4/2014 |
| JP | 2015-72800 A | 4/2015 |
| JP | 2015-76397 A | 4/2015 |
| JP | 2016-4703 A | 1/2016 |
| JP | 2016-004703 A | 1/2016 |
| JP | 2016-127004 A | 7/2016 |
| JP | 2018-14325 A | 1/2018 |
| JP | 6705068 B1 | 6/2020 |
| JP | 2020-102432 A | 7/2020 |
| KR | 10-2009-0126962 A | 12/2009 |
| KR | 10-2010-0099337 | 9/2010 |
| KR | 10-2012-0103263 A | 9/2012 |
| KR | 10-2014-0093529 | 7/2014 |
| KR | 10-2015-0016125 A | 2/2015 |
| KR | 10-2015-0026863 A | 3/2015 |
| KR | 10-2015-0090963 A | 8/2015 |
| KR | 10-2015-0119876 A | 10/2015 |
| KR | 10-2015-0122172 A | 10/2015 |
| KR | 10-2016-0032664 A | 3/2016 |
| KR | 10-2016-0041039 | 4/2016 |
| KR | 10-2016-0049995 A | 5/2016 |
| KR | 10-2018-0010122 A | 1/2018 |
| KR | 10-1886514 B1 | 8/2018 |
| KR | 10-2019-0032248 A | 3/2019 |
| KR | 10-2019-0065963 A | 6/2019 |
| KR | 10-2019-0078498 A | 7/2019 |
| KR | 10-2020-0033354 A | 3/2020 |
| KR | 10-2020-0044448 A | 4/2020 |
| KR | 10-2020-0070649 A | 6/2020 |
| KR | 10-2020-0090727 A | 7/2020 |
| WO | WO 2006/010894 A1 | 2/2006 |
| WO | 2011/086690 A1 | 7/2011 |
| WO | 2012/131881 A1 | 10/2012 |
| WO | WO 2012/131779 A1 | 10/2012 |
| WO | WO 2015/061399 A1 | 4/2014 |
| WO | WO 2014/142279 A1 | 9/2014 |
| WO | WO 2015/108163 A1 | 7/2015 |
| WO | WO 2016/060451 A1 | 4/2016 |
| WO | WO 2016/068594 A1 | 5/2016 |
| WO | 2016/175597 A1 | 11/2016 |

OTHER PUBLICATIONS

European Patent Office Action for corresponding European Application No. 17 206 091.5, dated Jun. 18, 2019, 4 pages.
Kim et al., "A New Coating Method for Alleviating Surface Degradation of $LiNi_{0.6}Co_{0.2}Mn_{0.2}O_2$ Cathode Material: Nanoscale Surface Treatment of Primary Particles," Nano Letters, Feb. 2015, pp. 2111-2119, DOI: 10.1021/acs.nanolett.5b00045.
EPO Extended Search Report dated Nov. 14, 2017, for corresponding European Patent Application No. 17182400.6 (7 pages).
U.S. Office Action dated Apr. 30, 2019, issued in U.S. Appl. No. 15/654,648 (17 pages).
Lim et al., "Advanced Concentration Gradient Cathode Material with Two-Slope for High-Energy and Safe Lithium Batteries," Advanced Functional Materials, 2015, vol. 25, pp. 4673-4680.
Noh, Hyung-Joo et al., "Cathode Material with Nanorod Structure—An Application for Advanced High-Energy and Safe Lithium Batteries," Chemistry of Materials, 2013, vol. 25, pp. 2109-2115.
Zheng, Zhuo et al., "Uniform Ni-rich $LiNi_{0.6}Co_{0.2}Mn_{0.2}O_2$ Porous Microspheres: Facile Designed Synthesis and Their Improved Electrocheminal Performance," Electrochimica Acta, vol. 191, 2016, pp. 401-410.
EPO Extended Search Report dated Dec. 4, 2017, corresponding to European Patent Application No. 17182408.9 (9 pages).
Japanese Office Action dated Aug. 6, 2018, corresponding to Japanese Patent Application No. 2017-140741 (4 pages).
Japanese Office Action dated Jan. 11, 2019, for corresponding Japanese Patent Application No. 2017-236042 (4 pages).
U.S. Office Action dated Mar. 8, 2019, issued in U.S. Appl. No. 15/654,623 (11 pages).
Office Action issued in U.S. Appl. No. 15/654,623 by the USPTO, dated Feb. 12, 2020, 15 pages.
Chinese Patent Office Action with English Translation for corresponding Chinese Patent Application No. 20170595368.0, dated Mar. 26, 2020, 25 pages.

(56) References Cited

OTHER PUBLICATIONS

Korean Office Action dated Dec. 9, 2019, for corresponding Korean Patent Application No. 10-2017-0167526 (98 pages).
U.S. Final Office Action dated Aug. 6, 2020, issued in U.S. Appl. No. 15/654,623 (17 pages).
U.S. Notice of Allowance dated Sep. 24, 2020, issued in U.S. Appl. No. 15/654,648 (8 pages).
U.S. Advisory Action dated Oct. 13, 2020, issued in U.S. Appl. No. 15/654,623 (7 pages).
Chinese Office Action, with English translation, dated Mar. 19, 2020, corresponding to Chinese Patent Application No. 201710595378.4 (16 pages).
Chinese Office Action, with English translation, dated Jul. 3, 2020, issued in corresponding Chinese Patent Application No. 201711293316.4 (18 pages).
Japanese Office Action dated Aug. 3, 2020, issued in corresponding Japanese Patent Application No. 2017-236042 (5 pages).
Japanese Office Action dated Aug. 31, 2020, issued in Japanese Patent Application No. 2019-163716 (6 pages).
U.S. Final Office Action dated Jun. 21, 2019, issued in U.S. Appl. No. 15/654,623 (10 pages).
U.S. Notice of Allowance dated Nov. 4, 2019, issued in U.S. Appl. No. 15/654,648 (10 pages).
U.S. Notice of Allowance dated Mar. 10, 2020, issued in U.S. Appl. No. 15/654,648 (8 pages).
Japanese Notice of Allowance dated Nov. 24, 2020, issued in corresponding Japanese Patent Application No. 2017-236042 (3 pages).
U.S. Notice of Allowance dated Jan. 14, 2021, issued in U.S. Appl. No. 15/654,648 (8 pages).
EPO Office Action dated Jun. 23, 2020, issued in European Patent Application No. 17182400.6 (6 pages).
Chinese Office Action, with English translation, dated Nov. 4, 2020, issued in Chinese Patent Application No. 201710595378.4 (18 pages).
Chinese Office Action, with English translation, dated Nov. 18, 2020, issued in Chinese Patent Application No. 201710595368.0 (19 pages).
EPO Third Party Observation dated Nov. 26, 2020, issued in European Patent Application No. 17182400.6 (11 pages).
Lee, Yongho, et al., "Facile formation of a Li3Po4 coating layer during synthesis of a lithium-rich layered oxide for high-capacity lithium ion batteries," Journal of Power Sources, vol. 315, 2016, pp. 284-293.
Yan, Pengfei, et al., "Tailoring of Grain Boundary Structure and Chemistry of Cathode Particles for Enhanced Cycle Stability of Lithium Ion Battery," 2018, 22 pages.
U.S. Office Action dated Apr. 2, 2021, issued in U.S. Appl. No. 15/654,623 (15 pages).
U.S. Notice of Allowance dated Apr. 28, 2021, issued in U.S. Appl. No. 15/654,648 (8 pages).
Japanese Office Action dated Jul. 5, 2021, issued in Japanese Patent Application No. 2019-163717 (6 pages).
U.S. Notice of Allowance dated Aug. 6, 2021, issued in U.S. Appl. No. 15/654,648 (8 pages).
U.S. Final Office Action dated Oct. 4, 2021, issued in U.S. Appl. No. 15/654,623 (16 pages).
Zhang, Xu-Dong, et al., "An effective LiBO2 coating to ameliorate the cathode/electrolyte interfacial issues of LiNi0.6Co0.2Mn0.2O2 in solid-state Li batteries," Journal of Power Sources, vol. 426, 2019, pp. 242-249.
US Notice of Allowance dated Dec. 6, 2021, issued in U.S. Appl. No. 15/654,648 (8 pages).

* cited by examiner

NICKEL-BASED ACTIVE MATERIAL FOR LITHIUM SECONDARY BATTERY, PREPARING METHOD THEREOF, AND LITHIUM SECONDARY BATTERY INCLUDING POSITIVE ELECTRODE INCLUDING THE SAME

CROSS-REFERENCE TO RELATED APPLICATION

This application claims priority to and the benefit of Korean Patent Application No. 10-2016-0166888, filed on Dec. 8, 2016, and Korean Patent Application No. 10-2017-0167526, filed on Dec. 7, 2017, in the Korean Intellectual Property Office, the disclosures of both of which are incorporated herein in their entireties by reference.

BACKGROUND

1. Field

One or more embodiments relate to a nickel (Ni)-based active material for a lithium secondary battery, a method of preparing the same, and a lithium secondary battery including a positive electrode having the Ni-based active material.

2. Description of the Related Art

With the development of portable electronic devices and communication devices, there is an increasing desire to develop lithium secondary batteries having a high energy density.

Lithium nickel manganese cobalt composite oxide, lithium cobalt oxide, and the like have been widely utilized as positive active materials of lithium secondary batteries. However, when these positive active materials are utilized, cracks may occur in primary particle units as a result of repeated charging and discharging so that a lithium secondary battery may have a short lifespan (e.g., long-term lifespan), a high resistance, and an unsatisfactory capacity.

SUMMARY

An aspect according to one or more embodiments is directed toward a nickel (Ni)-based active material for a lithium secondary battery in which occurrence of cracks is suppressed by reducing the stress caused by a volume change during charging and discharging.

An aspect according to one or more embodiments is directed toward a method of preparing the Ni-based active material.

An aspect according to one or more embodiments is directed toward a lithium secondary battery having a long lifespan by including a positive electrode including the Ni-based active material.

Additional aspects will be set forth in part in the description which follows and, in part, will be apparent from the description, or may be learned by practice of the presented embodiments.

According to one or more embodiments, a Ni-based active material for a lithium secondary battery includes a porous inner portion having closed pores and an outer portion, wherein the porous inner portion has a density less than that of the outer portion, and the nickel-based active material has a net density of 4.7 g/cc or less.

According to one or more embodiments, a method of preparing a Ni-based active material for a lithium secondary battery includes preparing the above described nickel-based active material by subjecting a mixture of a lithium precursor and a metal hydroxide to a primary heat treatment under an oxidizing gas atmosphere at 600° C. to 800° C.

The method may further include pretreating the mixture of the lithium precursor and the metal hydroxide under an oxidizing gas atmosphere at 400° C. to 700° C. for 1 to 3 hours before the primary heat treatment.

According to one or more embodiments, a lithium secondary battery includes a positive electrode including the Ni-based active material for a lithium secondary battery.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a nickel (Ni)-based active material for a lithium secondary battery, a method of preparing the same, and a lithium secondary battery including a positive electrode having the Ni-based active material will be exemplarily described in more detail with reference to the accompanying drawings.

A Ni-based active material for a lithium secondary battery according to an embodiment includes a porous inner portion having closed pores and an outer portion. The porous inner portion has a density less than that of the outer portion and the Ni-based active material has a net density of 4.7 g/cc or less. When the net density of the Ni-based active material is greater than 4.7 g/cc, volume expansion stress may increase during charging and discharging due to small empty spaces in particles. Accumulation of the volume expansion stress due to repeated charging and discharging may cause particle cracks, resulting in deterioration of lifespan characteristics. In this case, because pores included in the Ni-based active material are open pores (e.g., become open pores due to the cracks), a contact surface area between the Ni-based active material and an electrolytic solution increases, resulting in deterioration of lifespan characteristics of a lithium secondary battery including the same.

The Ni-based active material according to an embodiment has a net density of 4.5 to 4.67 g/cc.

Because the Ni-based active material according to an embodiment includes closed pores, occurrence of cracks caused by volume expansion during charging and discharging may be suppressed. The closed pores are independent pores having a structure in which all of the pore walls are closed with no contact with the electrolytic solution and surfaces of secondary particles. These closed pores may buffer a volume change occurring during charging and discharging without increasing the contact area between the Ni-based active material and the electrolytic solution.

Throughout the specification, the term "net density" refers to an intrinsic density of an electrode active material, and more particularly, refers to a density of only the portion completely filled with a substance except for gaps between particles. In the absence of closed pores, the net density is measured as a value equal to a solid density (theoretical density). However, in the case of a Ni-based active material having closed pores, the density decreases due to empty spaces formed therein. Thus, the net density of the Ni-based active material is a density of a solid having closed pores. Open pores, which are connected to surfaces and are not closed pores, are not reflected in the net density. A density calculated by dividing a weight by a volume may vary according to a method of measuring the volume and the net density is calculated by measuring a volume excluding the open pores (i.e., only counting the volume of the solid portion and the volume of the closed pores).

The net density is measured utilizing the Archimedes principle or by a gas pycnometer.

The Ni-based active material according to an embodiment has a net density of 4.50 to 4.7 g/cc, for example, 4.5165 to 4.6657 g/cc.

Throughout the specification, the "inner portion" and "outer portion" of the active material are defined as follows.

According to an embodiment, the terms "inner portion" and "outer portion" refer to an inner region and an outer region when the active material is divided (e.g., partitioned) at the same rate (e.g., at the same ratio) in all directions from the center to the surface of an active material, respectively. For example, the inner portion refers to a region corresponding to 10 to 90% by volume, for example, 50% by volume from the center, based on a total volume of the active material, and the outer portion refers to the remaining region.

According to another embodiment, the term "outer portion" refers to a region corresponding to 30 to 50% by volume, for example, 40% by volume, from the outermost surface based on a total volume of the Ni-based active material (i.e., from the center to the outermost surface thereof) or a region within 2 μm from the outermost periphery (i.e., based on a total distance from the center to the surface) of the Ni-based active material. The term "inner portion" refers to a region corresponding to 50 to 70% by volume, for example, 60% by volume, from the center based on the total volume of the Ni-based active material or the remaining region except for the region within 2 μm from the outermost periphery (i.e., based on the total distance from the center to the surface) of the Ni-based active material.

In the inner portion of the Ni-based active material according to an embodiment, pore sizes of the closed pores are in the range of 150 nm to 1 μm and a porosity is in the range of 3 to 30%. The porosity of the inner portion is about 1.2 times or more, for example, 2 times or more, greater than that of the outer portion.

The pore size and porosity of the inner portion are greater and more irregular than those of the outer portion.

For example, the outer portion of the Ni-based active material may have a porosity of 0.1 to 2.5%. The porosities of the inner portion and the outer portion used herein refer to porosities of closed pores included in the inner portion and the outer portion.

When the porosities of the inner portion and the outer portion of the Ni-based active material satisfy the aforementioned ranges, the outer portion becomes more densified than the inner portion, so that side reactions with an electrolytic solution at a high temperature may be efficiently suppressed.

The pore sizes of the inner portion may be in the range of 150 nm to 1 μm, for example, 200 to 500 nm, and the pore sizes of the outer portion may be less than 150 nm, for example, 100 nm or less, or in the range of 20 to 90 nm. Because the pore sizes of the inner portion are greater than those of the outer portion as described above, a lithium diffusion distance is shortened in secondary particles of the same size (e.g., shortened in comparison with secondary particles of the same size but without the above described pore structure), and the pores buffer a volume change occurring during charging and discharging without being exposed to the electrolytic solution. The term "pore size" refers to an average diameter of pores or a width of an opening of a pore when the pore has a spherical or circular shape. When the pore has an oval shape, the pore size refers to a length of a major axis.

The Ni-based active material includes plate particles (i.e., plate-shaped primary particles) whose major axes are radially arranged. The primary particles aggregate to form the secondary particles having the above described pore structure. In this case, a surface through which lithium may enter and exit (e.g., surface perpendicular to the (001) crystal plane) is exposed on the surface of the secondary particle. The outer portion of the Ni-based active material has exposed pores directed toward the inner portion from the surface and the inner portion has an irregular porous structure. The pores exposed on the surface are exposed pores through which the electrolytic solution passes. An "irregular porous structure" refers to a structure having pores having non-uniform and irregular pore sizes and pore shapes. The outer portion plate particles includes plate particles, and the plate particles may be radially arranged in the outer portion. The inner portion having the irregular porous structure includes plate particles in the same manner as in the outer portion. The plate particles are arranged irregularly in the inner portion, unlike in the outer portion.

The Ni-based active material according to an embodiment includes plate particles whose major axes are radially arranged.

Figure 1A:
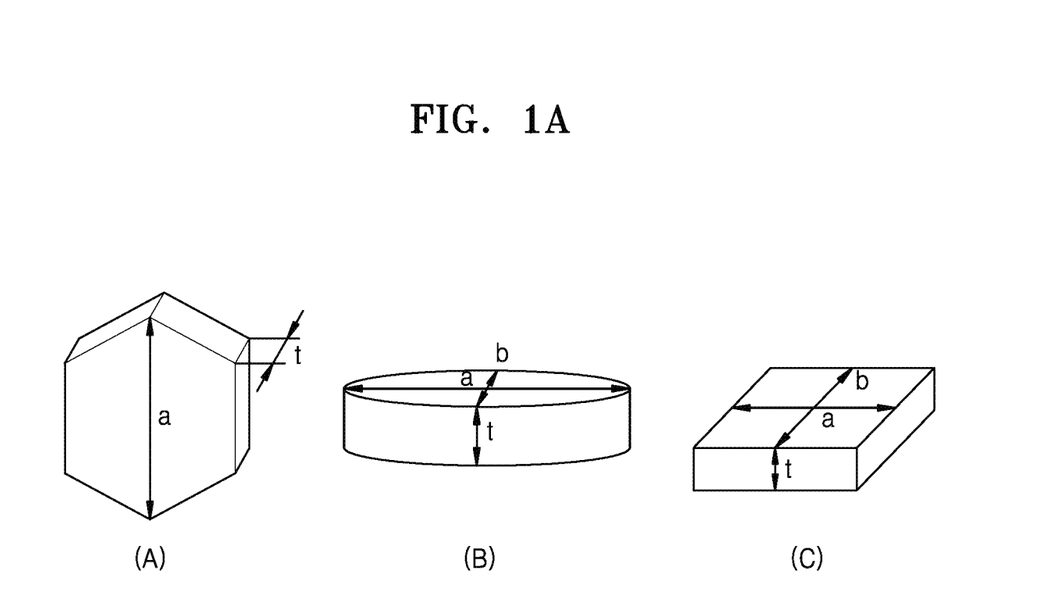
FIG. 1A is a schematic diagram illustrating shapes of a plate particle.

FIG. 1A is a schematic diagram illustrating shapes of the plate particle.

Referring to FIG. 1, the plate particle may have a polygonal nano plate shape as shown in (A), a nano disc shape as shown in (B), or a rectangular parallelepiped shape as shown in (C), each having a plane and a thickness direction crossing with the plane.

In FIG. 1A, a thickness t of the plate particle is smaller than lengths a and/or b in the plane. The length a in the plane may be longer than or equal to the length b. A direction in which the thickness t is defined in the plate particle is referred to as the thickness direction, and a direction in which the lengths a and b are arranged is referred to as the plane direction (e.g., lengthwise direction).

Figure 1B:
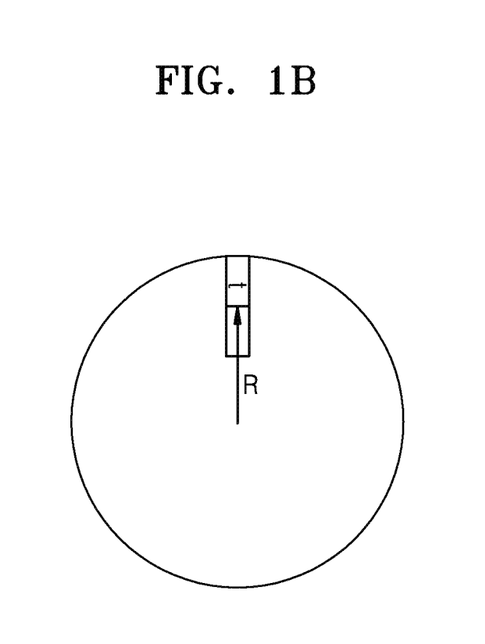
FIG. 1B is a diagram illustrating the radial direction in a secondary particle of a Ni-based active material according to an embodiment.

As used herein, the term "radially" indicates that a particle is arranged such that the thickness direction (e.g., the 001 direction) of the plate particle is perpendicular to a direction R toward the center of a secondary particle or aligned to be 85° to 95° with respect to direction R heading to the center of the secondary particle as shown in FIG. 1B.

An average thickness of the plate particles constituting the outer portion and the inner portion is in the range of 100 to 200 nm, for example, 120 to 180 nm, or 130 to 150 nm, and an average length thereof is in the range of 150 to 500 nm, for example, 200 to 380 nm, or 290 to 360 nm. The average length refers to a mean value of an average length of the major axis of the plate particle and an average length of the minor axis of the plate particle in the plane direction.

A ratio of the average thickness to the average length is from 1:2 to 1:10, for example, 1:2.0 to 1:5, or 1:2.3 to 1:2.9. When the ratio of the average thickness to the average length of the plate particles is within the aforementioned ranges, the sizes of the plate particles are small, the primary particles are radially arranged in the outer portion, a number of paths for diffusion of lithium are formed in a relatively large number of boundaries between particles on regions close to the surface, and a large number of crystal surfaces enabling lithium transfer of the outer portion are exposed. Thus, the degree of diffusion of lithium increases, thereby increasing initial efficiency and capacity. In addition, when the plate-like primary particles are radially arranged, pores exposed on the surface also face the center, thereby facilitating diffusion of lithium (i.e., lithium ions) from the surface. Because the radially arranged primary particles uniformly shrink and expand during intercalation and deintercalation of lithium, pores arranged in the 001 direction, which is a direction where particles expand during deintercalation of lithium, serve as a buffer, and because the plate-like primary particles are small in size, the possibility of occurrence of cracks decreases during shrinkage and expansion. In addition, because the pores of the inner portion further decreases a volume change, the possibility of forming cracks in the primary particles during charging and discharging decreases, thereby improving lifespan characteristics and reducing the resistance.

Closed pores and/or open pores may be present in the outer portion of the Ni-based active material. While it is difficult for an electrolyte, or the like, to be contained in the inner portion of the Ni-based active material due to the closed pores, the outer portion may contain the electrolyte, or the like, in the case when the outer portion of the Ni-based active material has open pores.

The Ni-based active material is an active material represented by Formula 1 below.

Formula 1

$$Li_a(Ni_{1-x-y-z}Co_xMn_yM_z)O_2 \quad \text{Formula 1}$$

In Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \leq a \leq 1.3$, $x \leq (1-x-y-z)$, $y \leq (1-x-y-z)$, $0 < x < 1$, $0 \leq y < 1$, and $0 \leq z < 1$. In the Ni-based active material of Formula 1, the content of nickel is greater than that of cobalt and greater than that of manganese.

In Formula 1, $0.95 \leq a \leq 1.3$, $0 < x \leq 0.3$, $0 \leq y \leq 0.5$, $0 \leq z \leq 0.05$, and $0.5 \leq (1-x-y-z) \leq 0.95$. In an embodiment, in Formula 1, $1.0 \leq a \leq 1.3$, $0 < x1/3$, $0 \leq y \leq 0.5$, $0 \leq z \leq 0.05$, and $1/3 \leq (1-x-y-z) \leq 0.95$. For example, a is from 1 to 1.1, x is from 0.1 to 0.3, and y is from 0.05 to 0.3 in Formula 1.

According to an embodiment, z is 0 in Formula 1.

According to another embodiment, when $0 < z \leq 0.05$ in Formula 1, M may be aluminum.

In the Ni-based active material, the content of nickel is greater than that of each of the other transition metals (e.g., Co and Mn) when a total amount of the transition metals is referred to as 1 mol. When the Ni-based active material having a high Ni content is utilized, a lithium secondary battery including a positive electrode having the same may have a high degree of diffusion of lithium, high conductivity, and higher capacity at the same voltage, the deterioration of lifespan characteristics due to occurrence of cracks as described above may be reduced.

The Ni-based active material may be $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, and/or $LiNi_{0.85}Co_{0.1}Al_{0.05}O_2$.

The Ni-based active material may have an overall porosity of 1 to 8%, for example, 1.5 to 7.3%. The outer portion of the Ni-based active material has a lower porosity than that of the inner portion. The outer portion has a closed porosity of 0.1 to 2.5%, for example, 0.1 to 2% and the inner portion has a closed porosity of 3 to 30%. The term "closed porosity" refers to the fraction of the closed pores (pores that the electrolytic solution cannot penetrate) with respect to a total volume of pores.

Because the Ni-based active material according to an embodiment includes radial plate particles, diffusion of lithium increases and stress caused by a volume change during charging and discharging lithium is suppressed, thereby inhibiting occurrence of cracks. In addition, formation of surface resistant layers is reduced during a manufacturing process and lithium is diffused in more directions on the surface, and thus an active surface area for diffusion of lithium increases.

Hereinafter, a method of preparing a Ni-based active material according to an embodiment will be described.

The Ni-based active material may be prepared by mixing a lithium precursor and a metal hydroxide at a predetermined molar ratio and subjecting the mixture to a primary heat treatment at 600 to 800° C. The Ni-based active material may have desired net density and porosity by performing a pretreatment process under an oxidizing gas atmosphere at 400 to 700° C. for 1 to 3 hours before performing the primary heat treatment. For example, the pretreatment process may be performed at 650° C. for 2 hours.

The metal hydroxide may be a compound represented by Formula 2 below.

$$(Ni_{1-x-y-z}Co_xMn_yM_z)(OH)_2 \quad \text{Formula 2}$$

In Formula 2, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum, $x \leq (1-x-y-z)$, $y \leq (1-x-y-z)$, $0 < x < 1$, $0 \leq y < 1$, and $0 \leq z < 1$.

In Formula 2, $0<x\leq0.3$, $0\leq y\leq0.5$, $0\leq z\leq0.05$, and $0.5\leq(1-x-y-z)\leq0.95$.

The metal hydroxide of Formula 2 may be $Ni_{0.6}Co_{0.2}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.85}Co_{0.1}Al_{0.05}(OH)_2$ or $Ni_{0.8}Co_{0.1}Mn_{0.1}(OH)_2$.

The lithium precursor may be, for example, lithium hydroxide, lithium fluoride, lithium carbonate, or a mixture thereof. A mixing ratio of the lithium precursor and the metal hydroxide is stoichiometrically adjusted to prepare the metal hydroxide of Formula 2.

The mixing may be dry mixing or performed utilizing a mixer or the like.

The primary heat treatment is performed under an oxidizing gas atmosphere.

The oxidizing gas atmosphere is prepared utilizing oxidizing gases such as oxygen and/or air. For example, the oxidizing gas includes 10 to 20% by volume of oxygen or air and 80 to 90% by volume of an inert gas.

The primary heat treatment may be carried out at a temperature of a densification temperature or lower as reactions between the lithium precursor and the metal hydroxide progress. Here, the densification temperature refers to a temperature at which crystallization may be sufficiently achieved so that the active material may realize a charging capacity (e.g., a high charging capacity).

The primary heat treatment may be carried out, for example, at 600 to 800° C., or, at 700 to 800° C. The heat treatment may be carried out, for example, for 3 to 10 hours but may vary depending on a temperature for the primary heat treatment.

When the heat treatment is performed under the aforementioned conditions, an Ni-based active material (e.g., primary particles of an Ni-based active material) including an outer portion having a radially arranged structure and an inner portion having an irregular porous structure may be prepared. Particles of the Ni-based active material may have an average thickness of 100 to 250 nm. Due to the average thickness in this range, stress caused by the volume change during charging and discharging may be suppressed.

The Ni-based active material particles are subjected to a secondary heat treatment in an oxidizing gas atmosphere. During the secondary heat treatment in the preparation of the Ni-based active material particles, the inner oxidizing atmosphere of the reactor is maintained as much as possible to inhibit formation of resistant layers and densify the particles.

The secondary heat treatment is performed at a temperature higher than the primary heat treatment, for example, at 700 to 900° C. The secondary heat treatment may be carried out, for example, for 3 to 10 hours but may vary depending on a temperature for the secondary heat treatment. Secondary particles of the Ni-based active material having an average particle diameter of 2 to 18 μm, for example, 3 to 15 pm are prepared.

A compound including at least one selected from titanium, zirconium, magnesium, barium, boron, and aluminum may further be added to secondary heat treatment of the Ni-based active material particles.

Examples of the compound including at least one selected from titanium, zirconium, magnesium, barium, boron, and aluminum may include titanium oxide, zirconium oxide, magnesium oxide, barium carbonate, boric acid, and/or aluminum oxide.

The content of the compound including at least one selected from titanium, zirconium, magnesium, barium, boron, and aluminum may be from 0.0001 to 10 parts by weight, for example, 0.0001 to 1 parts by weight, for example, 0.0005 to 0.01 parts by weight based on 100 parts by weight of the secondary particles of the Ni-based active material.

The existence and distribution of at least one of the oxides of titanium, zirconium, magnesium, barium, boron, and aluminum may be identified by Electron Probe Micro-Analysis (EPMA).

Because a diffusion rate of lithium decreases in the active material at the end of discharging and resistance to infiltration of lithium into the inner portion of the secondary particles of the Ni-based active material increases when the size of the secondary particles of the Ni-based active material is large, a discharge capacity relative to a charge capacity may decrease, thereby reducing the charging/discharging efficiency. However, in the secondary particle of the Ni-based active material according to an embodiment, a diffusion distance to the inner portion is decreased due to the porous structure of the inner portion and lithium may be easily inserted into the surface due to the radial arrangement of the outer portion toward the surface. In addition, because the primary particles of the Ni-based active material are small in size, the lithium transfer paths may be easily secured between the crystal grains. Also, the small sizes of the primary particles and pores between the primary particles alleviate the volume change occurring during charging and discharging, thereby reducing the stress caused by the volume change during charging and discharging.

After the Ni-based positive active material according to an embodiment is cut in a cross section, the volume ratio and the area ratio between the inner portion and the outer portion are observed. When the inner portion is defined as a region within about 60% from the center (e.g., within 60% of the radius from the center), the inner portion may be 20 to 35% by volume, for example, about 22%, based on a total volume of the Ni-based active material.

A C-plane of the primary particle of the Ni-based active material according to an embodiment is arranged in a radial direction.

A method of preparing a metal hydroxide having a porous plate particle shape according to an embodiment will be described.

The method of preparing the metal hydroxide is not particularly limited, for example, a coprecipitation method, a solid phase method, or the like may be utilized. Hereinafter, a method of preparing a compound represented by Formula 2 as an example of the metal hydroxide by a coprecipitation method will be described.

A nickel precursor, a cobalt precursor, a manganese precursor, and a metal M precursor as raw materials of the Ni-based active material are mixed with a solvent to prepare a precursor mixture.

Amounts of the nickel precursor, the cobalt precursor, the manganese precursor, and the metal (M) precursor are stoichiometrically adjusted to prepare the compound of Formula 2 above.

The solvent may be water, ethanol, propanol, butanol, and/or the like. An amount of the solvent may be in the range of 100 to 2000 parts by weight based on 100 parts by weight of a total weight of the nickel precursor, the cobalt precursor, the manganese precursor, and the metal precursor.

A complexing agent and a pH adjusting agent are added to the precursor mixture to adjust the pH of the mixture and to obtain a precipitate by a coprecipitation reaction. The pH of the mixture is adjusted, for example, to 11 to 13. The obtained precipitate is filtered and heat-treated. The heat treatment is carried out at 20 to 160° C. to dry the product.

The complexing agent serves to control a rate of formation of the precipitate in the coprecipitation reaction and may be ammonium hydroxide ($NH_4OH$) or citric acid. The complexing agent is utilized in a suitable amount commonly utilized in the art.

The pH adjusting agent serves to adjust the pH of a reaction mixture to 6 to 12, and may be ammonium hydroxide ($NH_4OH$), sodium hydroxide (NaOH), sodium carbonate ($Na_2CO_3$), and/or sodium oxalate ($Na_2C_2O_4$).

For example, the nickel precursor may be nickel sulfate, nickel chloride, and/or nickel nitrate. For example, the cobalt precursor may be cobalt sulfate, cobalt chloride, and/or cobalt nitrate. For example, the manganese precursor may be manganese sulfate, manganese nitrate, and/or manganese chloride. For example, the metal M precursor may be metal carbonate, metal sulfate, metal nitrate, and/or metal chloride.

Hereinafter, a method of manufacturing a lithium secondary battery including a positive electrode having the Ni-based active material according to an embodiment, a negative electrode, a lithium salt-containing non-aqueous electrolyte, and a separator will be described.

The positive electrode and the negative electrode are prepared by applying a positive active material layer forming composition and a negative active material layer forming composition to a current collector respectively, and drying the compositions.

The positive active material layer forming composition is prepared by mixing a positive active material, a conductive agent, a binder, and/or a solvent. The positive active material according to an embodiment is utilized as the positive active material.

The binder assists binding of the active material to the conductive agent and to the current collector, and is added to the composition in an amount of 1 to 50 parts by weight based on 100 parts by weight of a total weight of the positive active material. Non-limiting examples of the binder include polyvinylidene fluoride, polyvinyl alcohol, carboxymethyl cellulose (CMC), starch, hydroxypropyl cellulose, regenerated cellulose, polyvinyl pyrrolidone, polytetrafluoro ethylene, polyethylene, polypropylene, ethylene-propylene-diene terpolymer (EPDM), sulfonated EPDM, styrene butadiene rubber, a fluoride rubber, and various copolymers. The amount of the binder may be in the range of 2 to 5 parts by weight based on 100 parts by weight of the total weight of the positive active material. When the amount of the binder is within this range, a sufficient binding force of the active material layer to the current collector may be obtained.

The conductive agent may be any suitable conductive agent that is commonly utilized in the art and does not cause any chemical change in the fabricated battery. For example, the conductive agent may be graphite such as natural graphite and artificial graphite; a carbonaceous material such as carbon black, acetylene black, Ketjen black, channel black, furnace black, lamp black, and thermal black; conductive fiber such as carbon fiber and metal fiber; metal powder such as aluminum powder, and nickel powder; carbon fluoride powder conductive whisker such as zinc oxide and potassium titanate; conductive metal oxide such as titanium oxide; and conductive materials such as polyphenylene derivatives.

An amount of the conductive agent may be in the range of 2 to 5 parts by weight based on 100 parts by weight of the total weight of the positive active material. When the amount of the conductive agent is within the range described above, an electrode obtained therefrom has high conductivity.

A non-limiting example of the solvent may be N-methylpyrrolidone (NMP).

An amount of the solvent may be in the range of 100 to 3000 parts by weight based on 100 parts by weight of the total weight of the positive active material. When the amount of the solvent is within the range described above, a process of forming the positive active material layer is facilitated.

The positive current collector may have a thickness of about 3 to about 500 μm and may be any suitable current collector that does not cause any chemical change in a fabricated battery and has high conductivity (e.g., electrical conductivity). Examples of the positive current collector include stainless steel, aluminum, nickel, titanium, calcined carbon; or aluminum or stainless steel surface-treated with carbon, nickel, titanium or silver. The positive current collector may be processed to have fine irregularities on the surface thereof so as to enhance adhesiveness of the positive current collector to the positive active material, and may be utilized in any of various suitable forms including films, sheets, foils, nets, porous structures, foams, and non-woven fabrics.

Separately (or independently), the negative active material forming composition is prepared by mixing a negative active material, a binder, a conductive agent, and/or a solvent.

A material allowing intercalation and deintercalation of lithium ions is utilized as the negative active material. Non-limiting examples of the negative active material include graphite, a carbonaceous material (such as carbon), lithium metal, an alloy thereof, and silicon oxide. In the present embodiment, silicon oxide is utilized.

The binder is added in an amount of 1 to 50 parts by weight based on 100 parts by weight of the total weight of the negative active material. The examples of the binder may be the same as those for the positive electrode.

The conductive agent is utilized in an amount of 1 to 5 parts by weight based on 100 parts by weight of the total weight of the negative active material. When the amount of the conductive agent is within the range described above, an electrode obtained therefrom has high conductivity.

The solvent may be utilized in an amount of 1 to 10 parts by weight based on 100 parts by weight of the total weight of the negative active material. When the amount of the solvent is within the range described above, a process of forming the negative active material is facilitated.

The same conductive agent and solvent as for the positive electrode may be utilized.

The negative current collector may have a thickness of about 3 to about 500 μm and may be any suitable current collector that does not cause any chemical change in a fabricated battery and has conductivity (e.g., electrical conductivity). Examples of the negative current collector include copper, stainless steel, aluminum, nickel, titanium, calcined carbon, an aluminum-cadmium alloy; or copper or stainless steel surface-treated with carbon, nickel, titanium or silver. The negative current collector may also be processed to have fine irregularities on the surface thereof so as to enhance adhesiveness of the negative current collector to the negative active material in the same manner as the positive current collector, and may be utilized in any of various suitable forms including films, sheets, foils, nets, porous structures, foams, and non-woven fabrics.

The separator is disposed between the positive electrode and the negative electrode prepared according to the above-described process.

The separator may have a pore diameter of 0.01 to 10 µm and a thickness of 5 to 300 µm. Examples of the separator may include: an olefin-based polymer such as polypropylene and polyethylene; or a sheet or non-woven fabric formed of glass fiber. When a solid electrolyte such as a polymer electrolyte is utilized as the electrolyte, the solid electrolyte may also serve as the separator.

The lithium salt-containing non-aqueous electrolyte includes a non-aqueous electrolytic solution and a lithium salt. The non-aqueous electrolyte may be a non-aqueous electrolyte, an organic solid electrolyte, an inorganic solid electrolyte, or the like.

Non-limiting examples of the non-aqueous electrolyte include any suitable aprotic organic solvent such as N-methyl-2-pyrrolidone, propylene carbonate, ethylene carbonate, butylene carbonate, dimethyl carbonate, diethyl carbonate, gamma-butyro lactone, 1,2-dimethoxy ethane, 2-methyl tetrahydrofuran, dimethylsulfoxide, 1,3-dioxolane, formamide, N,N-dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or a combination thereof.

Non-limiting examples of the organic solid electrolyte include polyethylene derivatives, polyethylene oxide derivatives, polypropylene oxide derivatives, polyvinyl alcohol, and polyvinylidene fluoride.

Non-limiting examples of the inorganic solid electrolyte include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte, and non-limiting examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NL$, lithium chloroborate, lower aliphatic lithium carboxylate, and lithium tetraphenyl borate.

Figure 2:
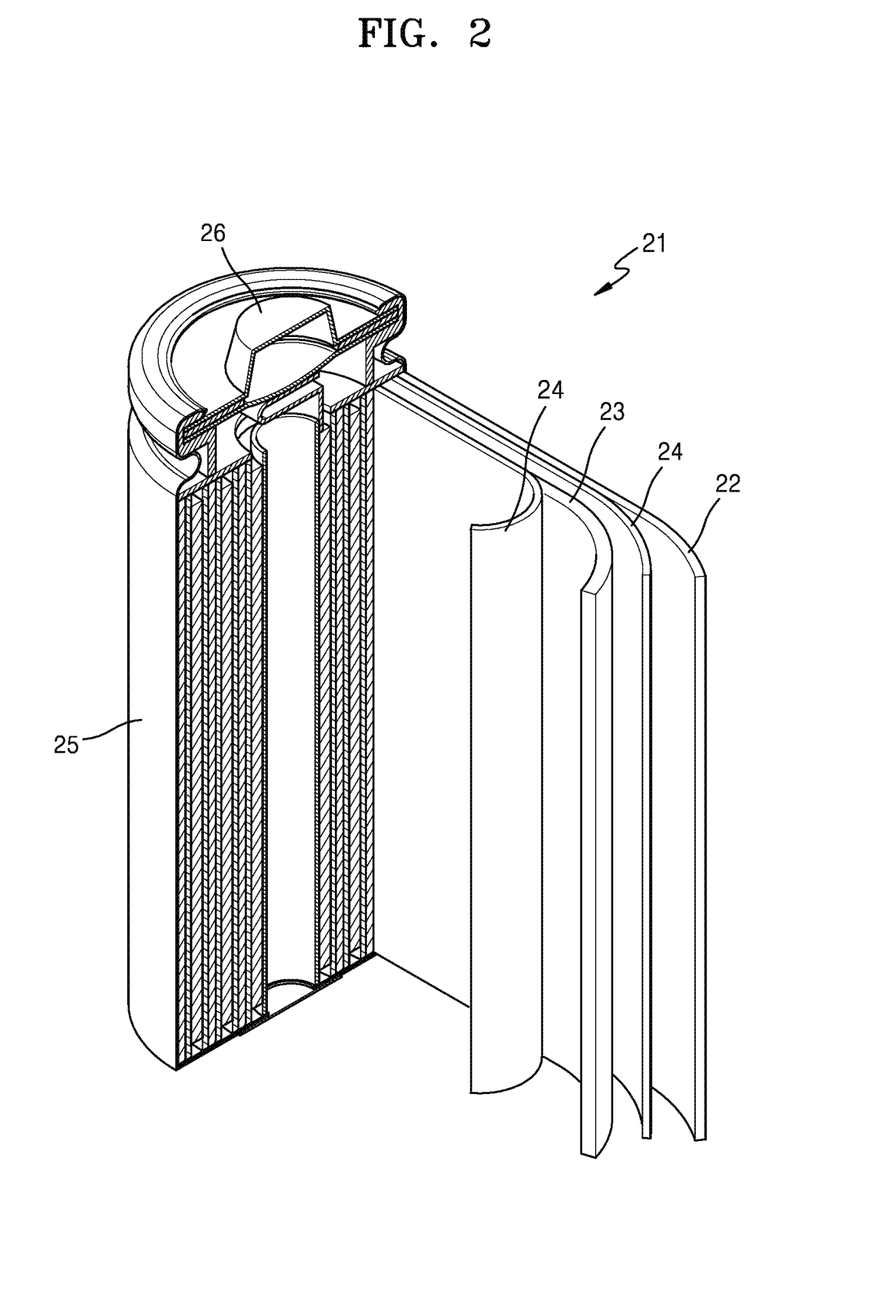
FIG. 2 is a cross-sectional view illustrating a structure of a lithium secondary battery according to an embodiment.

FIG. 2 is a cross-sectional view illustrating a structure of a lithium secondary battery according to an embodiment.

Referring to FIG. 2, a lithium secondary battery 21 includes a positive electrode 23, a negative electrode 22, and a separator 24. The positive electrode 23, the negative electrode 22, and the separator 24 are wound or folded into a battery case 25. Then, an organic electrolytic solution is injected into the battery case 25, and the battery case 25 is sealed by a cap assembly 26, thereby completing the manufacture of the lithium secondary battery 21. The battery case 25 may have a cylindrical shape, a rectangular shape, or a thin-film shape. For example, the lithium secondary battery 21 may be a large-sized thin film battery. The lithium secondary battery may be a lithium ion secondary battery. The separator may be interposed between the positive electrode and the negative electrode to form a battery assembly. When the battery assembly is stacked in a bi-cell structure and impregnated with the organic electrolytic solution and the resultant is inserted into a pouch and sealed, the manufacture of a lithium ion polymer battery is completed. Also, a plurality of battery assemblies may be stacked to form a battery pack, which may be utilized in various devices that require high capacity and high output, for example, in notebook computers, smart phone, and electric vehicles.

In addition, the lithium secondary battery may be suitable for use as a power source of electric vehicles (EVs) due to high storage stability at high temperatures, excellent lifespan characteristics, and high rate properties. For example, the lithium secondary battery may be utilized in hybrid vehicles such as plug-in hybrid electric vehicle (PHEVs).

Hereinafter, one or more example embodiments will be described in more detail with reference to the following examples and comparative examples. However, these examples are not intended to limit the purpose and scope of the one or more example embodiments.

PREPARATION EXAMPLE 1

Preparation of Composite Metal Hydroxide

A composite metal hydroxide ($Ni_{0.6}Co_{0.2}Mn_{0.2}(OH)_2$) as radial and porous plate particles was obtained according to a coprecipitation method which will be described later.

Ammonia water was added to a reactor and while stoichiometrically adjusting raw materials of a Ni-based active material to obtain a desired product, the pH of the mixture was adjusted utilizing sodium hydroxide. Next, the mixture was maintained while stirring until a desired particle size was obtained, and the adding of the raw materials was stopped. The resultant was then dried to obtain a product.

In more detail, nickel sulfate ($NiSO_4 \cdot 6H_2O$) as raw materials of the Ni-based active material, cobalt sulfate ($CoSO_4 \cdot 7H_2O$), and manganese sulfate ($MnSO_4 \cdot H_2O$) were dissolved in distilled water (as a solvent) at a molar ratio of 6:2:2 to prepare a mixed solution. A diluent of ammonia water ($NH_4OH$) and sodium hydroxide, as a precipitating agent, were prepared for formation of a complex. Next, the mixed solution of metal raw materials, ammonia water, and sodium hydroxide were added into a reactor respectively. Sodium hydroxide was added thereto to maintain the pH inside the reactor. The reactor was maintained for about 20 hours while stirring, and then the introduction of the raw materials was stopped.

The slurry solution in the reactor was filtered and washed with high purity distilled water and dried in a hot air oven for 24 hours to obtain the powder of a composite metal hydroxide ($Ni_{0.6}Co_{0.2}Mn_{0.2}(OH)_2$).

PREPARATION EXAMPLE 2

Preparation of Composite Metal Hydroxide

A composite metal hydroxide ($Ni_{0.5}Co_{0.2}Mn_{0.3}(OH)_2$) was obtained in substantially the same manner as in Preparation Example 1, except that the amounts of the nickel sulfate, cobalt sulfate, and manganese sulfate were changed so as to obtain the composite metal hydroxide ($Ni_{0.5}Co_{0.2}Mn_{0.3}(OH)_2$) and the mixture was maintained for 25 hours.

PREPARATION EXAMPLE 3

Preparation of Composite Metal Hydroxide

A radial, porous composite metal hydroxide ($Ni_{0.8}Co_{0.1}Mn_{0.1}(OH)_2$) was obtained in substantially the same manner as in Preparation Example 1, except that the amounts of the nickel sulfate, cobalt sulfate, and manganese sulfate were changed so as to obtain the porous composite metal hydroxide ($Ni_{0.8}Co_{0.1}Mn_{0.1}(OH)_2$) and the mixture was maintained for 25 hours.

PREPARATION EXAMPLE 4

Preparation of Composite Metal Hydroxide

A radial, porous composite metal hydroxide ($Ni_{0.85}Co_{0.1}Al_{0.05}(OH)_2$) was obtained in substantially the same manner as in Preparation Example 1, except that a mixture of nickel sulfate ($NiSO_4 \cdot 6H_2O$), cobalt sulfate ($CoSO_4 \cdot 7H_2O$), and aluminum nitrate ($Al(NO_3)_3 \cdot 9H_2O$) were utilized as raw materials of the positive active material at a molar ratio of 85:10:5 and the mixture was maintained for 18 hours.

PREPARATION EXAMPLE 5

Preparation of Composite Metal Hydroxide

A composite metal hydroxide ($Ni_{1/3}Co_{1/3}Mn_{1/33}(OH)_2$) having a radial and porous plate particle shape was obtained in substantially the same manner as in Preparation Example 1, except that the amounts of nickel sulfate, cobalt sulfate, and manganese sulfate were changed so as to obtain the porous composite metal hydroxide ($Ni_{1/3}Co_{1/3}Mn_{1/33}(OH)_2$) and the mixture was maintained for 28 hours.

EXAMPLE 1

Preparation of Secondary Particle of Ni-based Active Material

The radial, porous composite metal hydroxide ($Ni_{0.6}Co_{0.2}Mn_{0.2}(OH)_2$) prepared according to Preparation Example 1 and lithium hydroxide (LiOH) were dry mixed at a molar ratio of 1:1 and the mixture was subjected to a pretreatment at 650° C. for about 2 hours. Next, the mixture was subjected to a primary heat treatment at about 780° C. for 8 hours in an atmospheric condition (e.g., ambient atmospheric condition) to obtain particles of the Ni-based active material ($LiNi_{0.6}Co_{0.2}Mn_{0.2}O_2$).

Next, the resultant was subjected to a secondary heat treatment at about 830° C. for 6 hours in an oxidizing (e.g., oxygen) atmosphere to obtain secondary particles of the Ni-based active material ($LiNi_{0.6}Co_{0.2}Mn_{0.2}O_2$). In the Ni-based active material particles obtained as described above, closed pores were observed in an inner portion.

EXAMPLE 2

Ni-based active material particles were obtained in substantially the same manner as in Example 1, except that the primary heat treatment was performed at 750° C. for 10 hours and the secondary heat treatment was performed at 850° C. for 6 hours.

COMPARATIVE EXAMPLE 1

Lithium hydroxide ($LiOH \cdot H_2O$) and a composite metal hydroxide ($Ni_{0.6}Co_{0.2}Mn_{0.2}(OH)_2$) with no pores in an inner portion and not radially arranged were dry mixed at a molar ratio of 1:1. The mixture was heat treated (i.e., subjected to a primary heat treatment) at about 870° C. for 15 hours under an atmospheric condition. A product obtained after the primary heat treatment was subjected to a secondary heat treatment at about 500° C. for 6 hours in an oxidizing (e.g., oxygen) atmosphere to obtain secondary particles of the Ni-based active material ($LiNi_{0.6}Co_{0.2}Mn_{0.2}O_2$).

COMPARATIVE EXAMPLE 2

Lithium hydroxide ($LiOH \cdot H_2O$) and a composite metal hydroxide ($Ni_{0.6}Co_{0.2}Mn_{0.2}(OH)_2$) with no pores in an inner portion and not radially arranged were dry mixed at a molar ratio of 1:1. The mixture was heat treated at about 890° C. for 15 hours under an atmospheric condition to obtain secondary particles of the Ni-based active material ($LiNi_{0.6}Co_{0.2}Mn_{0.2}O_2$).

COMPARATIVE EXAMPLE 3

Lithium hydroxide ($LiOH \cdot H_2O$) and a composite metal hydroxide ($Ni_{0.6}Co_{0.2}Mn_{0.2}(OH)_2$) radially arranged and having a dense central portion and a porous outer portion were dry mixed at a molar ratio of 1:1. The mixture was heat treated at about 800° C. for 6 hours under an atmospheric condition to obtain particles of the Ni-based active material ($LiNi_{0.6}Co_{0.2}Mn_{0.2}O_2$). An inner portion of the Ni-based active material particles obtained as described above had closed pores. The outer portion of the Ni-based active material particles had open pores.

MANUFACTURE EXAMPLE 1

A lithium secondary battery was manufactured as follows by utilizing the secondary particles of the Ni-based active material ($LiNi_{0.6}Co_{0.2}Mn_{0.2}O_2$) prepared according to Example 1 as a positive active material.

96 g of the secondary particles of the Ni-based active material ($LiNi_{0.6}Co_{0.2}Mn_{0.2}O_2$) obtained according to Example 1, 2 g of polyvinylidene fluoride, 47 g of N-methyl pyrrolidone as a solvent, and 2 g of carbon black as a conductive agent were mixed utilizing a mixer to remove air bubbles and prepare a uniformly dispersed positive active material layer forming slurry.

The slurry prepared according to the process described above was coated on an aluminum foil utilizing a doctor blade to form a thin electrode plate which was dried at 135° C. for 3 hours or more, followed by rolling and vacuum drying to prepare a positive electrode.

A 2032 type coin cell was prepared utilizing the positive electrode and Li metal as a counter electrode. A separator formed of a porous polyethylene (PE) film having a thickness of about 16 μm was interposed between the positive electrode and the Li metal counter electrode and an electrolytic solution was injected thereinto to prepare the 2032 type coin cell. In this case, the electrolytic solution was prepared by dissolving 1.10 M $LiPF_6$ in a mixed solvent of ethylene carbonate (EC) and ethylmethyl carbonate (EMC) in a volume ratio of 3:5.

MANUFACTURE EXAMPLE 2

A lithium secondary battery was manufactured in substantially the same manner as in Manufacture Example 1, except that the Ni-based active material prepared according to Example 2 was utilized instead of the Ni-based active material prepared according to Example 1.

COMPARATIVE MANUFACTURE EXAMPLES 1 to 3

Lithium secondary batteries were manufactured in substantially the same manner as in Manufacture Example 1, except that the Ni-based active materials prepared according to Comparative Examples 1 to 3 were respectively utilized instead of the Ni-based active material prepared according to Example 1.

EVALUATION EXAMPLE 1

Scanning Electron Microscopy (SEM) Analysis

The Ni-based active material particles prepared according to Examples 1 and 2 and Comparative Examples 1 to 3 were analyzed utilizing a scanning electron microscope. A Magellan 400L (FEI company) was utilized as the scanning electron microscope. Cross-sections of samples were pretreated by milling at 6 kV and 150 μA for 4 hours utilizing a CP2 manufactured by JEOL. The SEM image analysis was performed at 350 V.

The results of SEM image analysis are shown in FIGS. 3A to 3E. FIGS. 3A to 3E are SEM images of the Ni-based active materials respectively prepared according to Example 1, Example 2, Comparative Example 1, Comparative Example 2, and Comparative Example 3.

Figure 3A:
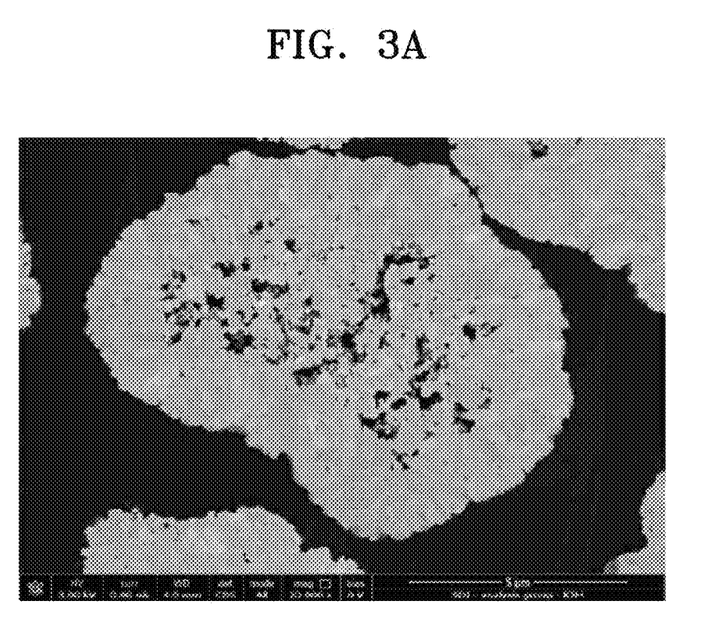
FIGS. 3A to 3E are scanning electron microscopy (SEM) images of Ni-based active materials prepared according to Example 1, Example 2, Comparative Example 1, Comparative Example 2, and Comparative Example 3, respectively.
Figure 3B:
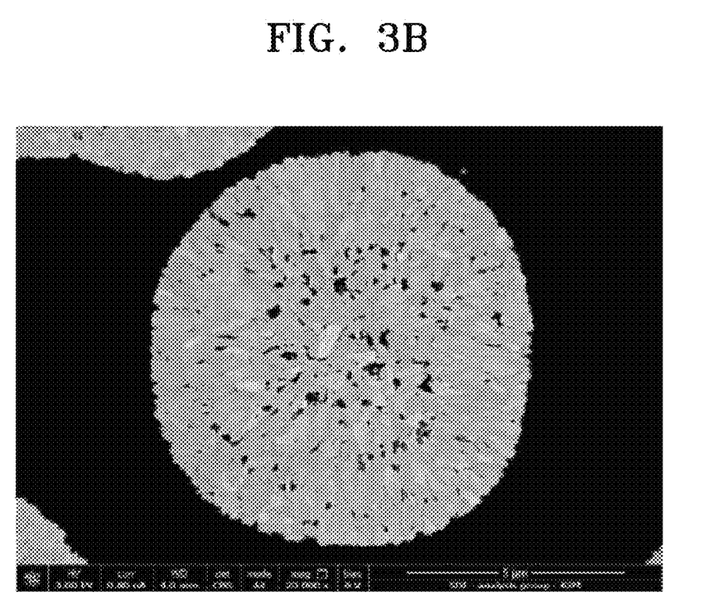

Based on the analysis results, it was confirmed that the Ni-based active materials prepared according to Examples 1 and 2 had outer portions denser than inner portions.

Figure 3C:
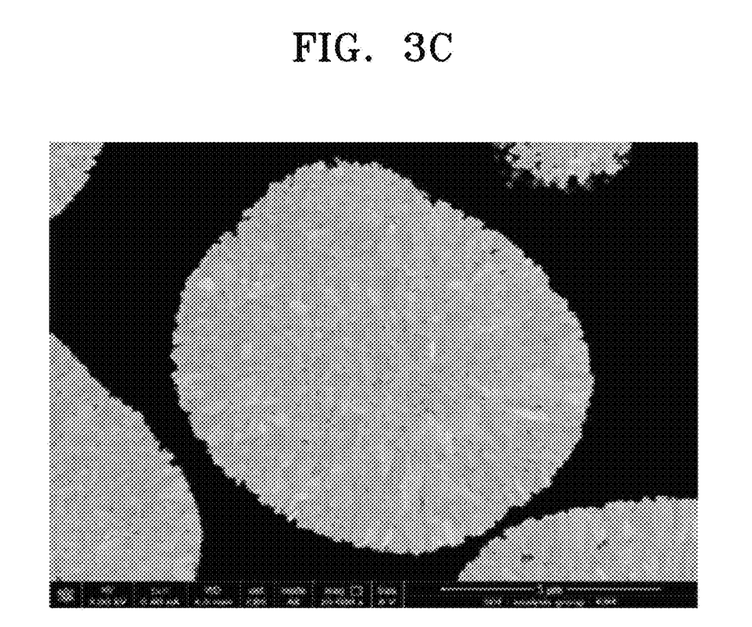
Figure 3D:
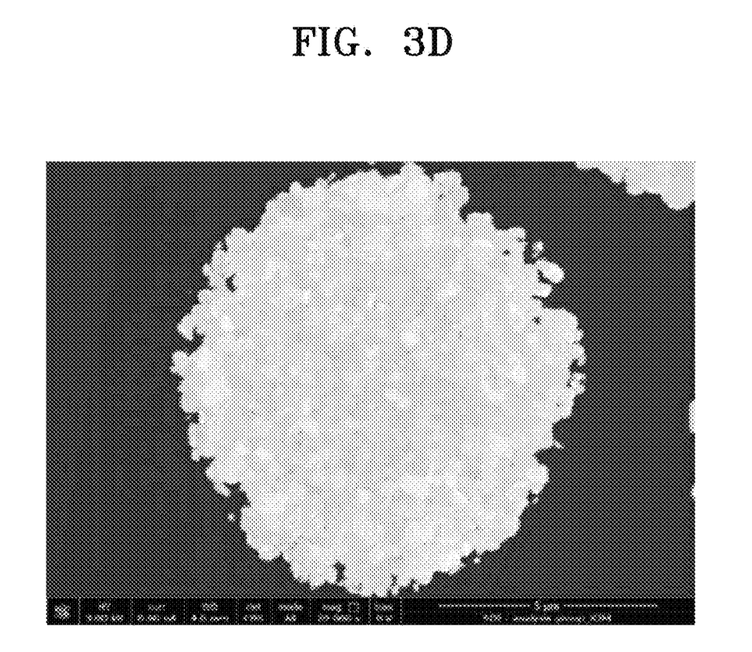
Figure 3E:
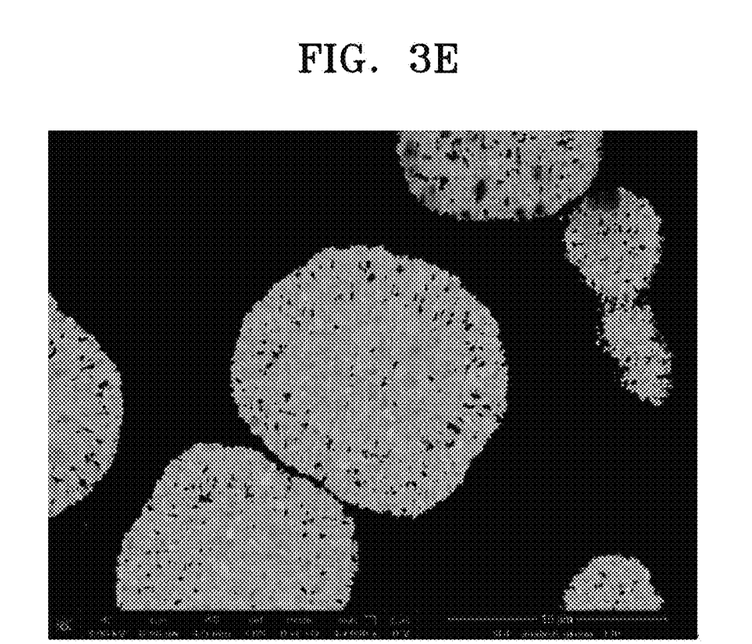

On the contrary, the Ni-based active materials prepared according to Comparative Examples 1 and 2 exhibited almost the same density in inner portions and outer portions and had almost no pores in comparison with those of Examples 1 and 2. In addition, it was confirmed that the Ni-based active material prepared according to Comparative Example 3 includes a dense inner portion and a porous outer portion.

EVALUATION EXAMPLE 2

Measurement of Porosity and Pore Size of Active Material in Inner Portion and Outer Portion Porosity and pore size were measured in inner portions and outer portions of the Ni-based active material particles prepared according to Examples 1 and 2 and Comparative Examples 1 and 3. Here, the porosity and the pore size were evaluated utilizing SEM images of cross-sections of the active materials. A Magellan 400L (FEI company) was utilized as the scanning electron microscope. Cross-sections of samples were pretreated by milling at 6 kV and 150 μA for 4 hours utilizing a CP2 manufactured by JEOL. The SEM image analysis was performed at 350 V.

The analysis results are shown in Table 1 below.

TABLE 1

|  | Porosity of inner portion | Porosity of outer portion | Pore size of inner portion (nm) | Pore size of outer portion (nm) |
|---|---|---|---|---|
| Example 1 | 30 | 2 | 500 | 30 |
| Comparative Example 1 | 2 | 2 | 30 | 30 |
| Comparative Example 3 | 2 | 20 | 30 | 30 |

Referring to Table 1, it was confirmed that the inner portion had irregular closed pores distributed therein and the outer portion had less pores and a denser structure than the inner portion in the Ni-based active material prepared according to Example 1 in comparison with the Ni-based active material prepared according to Comparative Example 3. On the contrary, it was confirmed that in the Ni-based active material of Comparative Example 3, the inner portion had a lower porosity and pores were mainly distributed in the outer portion of the particles.

In addition, SEM image analysis was performed on the secondary particles of the Ni-based active material prepared according to Example 1. Cross-sections of samples were pretreated by milling at 6 kV and 150 μA for 4 hours utilizing a CP2 manufactured by JEOL. The SEM image analysis was performed at 350 V.

Figure 5A:
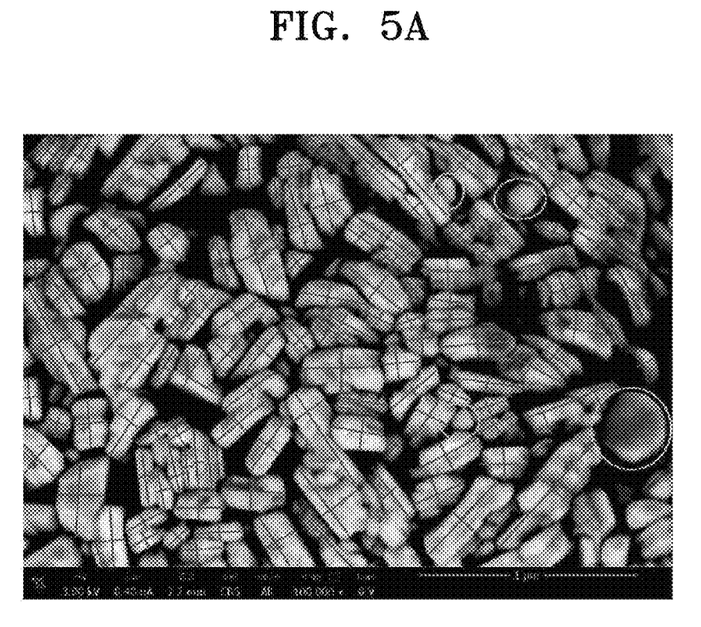
FIG. 5A is an SEM analysis image illustrating lengths of primary particles of a Ni-based active material having plate shapes in a plane direction and a thickness direction on a surface of a secondary particle according to Example 1.
Figure 5B:
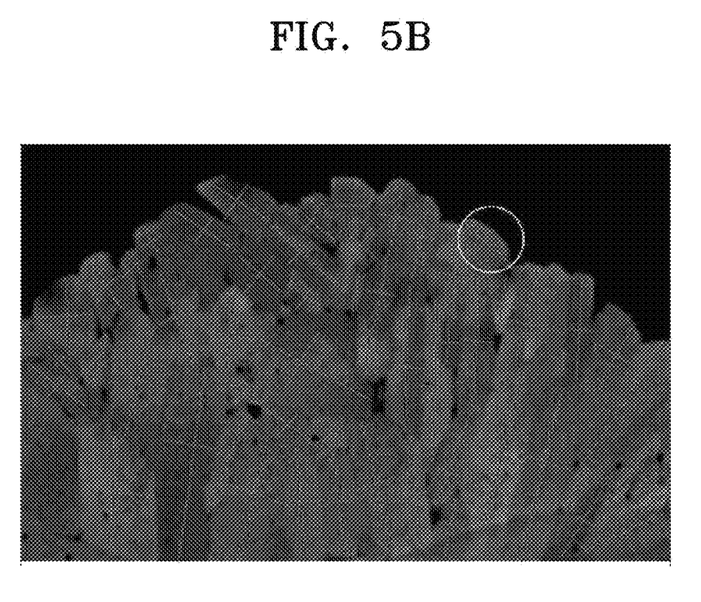
FIG. 5B is an SEM analysis image illustrating lengths of primary particles of a Ni-based active material having plate shapes in a plane direction and a thickness direction on a cross-section of a secondary particle according to Example 1.

FIG. 5A is an SEM analysis image of a surface of a secondary particle of a Ni-based active material. FIG. 5B is an SEM analysis image of a cross-section thereof.

Referring to FIGS. 5A and 5B, most of the primary particles of the Ni-based active material in plate shapes are radially arranged and some of the plate particles are not radially arranged as indicated with a circle. In this regard, an amount of the plate particles that are not radially arranged is about 3% by weight based on 100 parts by weight of a total weight of the radial plate particles and non-radial plate particles. The term "non-radial plate particles" refer to plate particles which are not radially arranged.

Referring to the states of plate particles of the SEM images illustrated in FIGS. 5A and 5B, average lengths, average thicknesses, and average ratios (average length/average thickness ratios) were calculated and shown in Table 2 below.

TABLE 2

|  | Surface |  | Cross-section |
|---|---|---|---|
| Average length (nm) | 290 | Average length (nm) | 360 |
| Average thickness (nm) | 130 | Average thickness (nm) | 150 |
| Average ratio | 2.3 | Average ratio | 2.9 |

EVALUATION EXAMPLE 3

Net Density of Active Material

Net densities of the Ni-based active materials prepared according to Examples 1 and 2 and Comparative Examples 1 to 3 were evaluated utilizing a gas pycnometer.

Evaluation results of the overall net densities of the Ni-based active materials are shown in Table 3 below.

TABLE 3

|  | Net density (g/cc) |
|---|---|
| Example 1 | 4.5165 |
| Example 2 | 4.6657 |
| Comparative Example 1 | 4.7613 |
| Comparative Example 2 | 4.7706 |
| Comparative Example 3 | 4.7501 |

Referring to Table 3, it was confirmed that the inner portions of the Ni-based active materials of Examples 1 and 2 had closed pores and the net densities thereof were less than 4.7 g/cc in comparison with the Ni-based active materials of Comparative Examples 1 and 2 which do not include pores. Although the Ni-based active material of Comparative Example 3 had pores, the pores are open pores. In this case, if the open pores were present in the outer portion, the effect of the open pores on the net density was negligible.

EVALUATION EXAMPLE 4

Lifespan Characteristics

The coin cells manufactured according to Manufacture Example 1 and Comparative Manufacture Examples 1 to 3 were charged and discharged once at 0.1 C for formation. After formation, the coin cells were charged and discharged once at 0.2 C to confirm initial charging and discharging characteristics and charged and discharged 50 times at 45° C. at 1 C to observe charging and discharging characteristics. Charging was set to be initiated at a constant current (CC) mode, changed into a constant voltage (CV) mode, and cut off at 4.3 V and 0.05 C. Discharging was set to be initiated at the CC mode and cut off at 3.0 V.

Figure 4A:
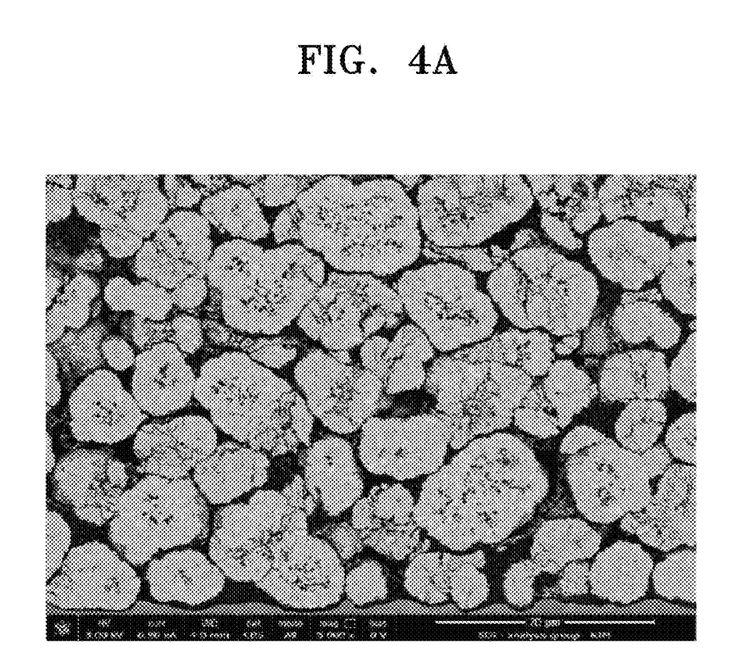
FIGS. 4A to 4C are SEM images of cross-sections of positive electrodes of coin cells prepared according to Manufacture Example 1 and Comparative Manufacture Examples 1 and 2, respectively.
Figure 4B:
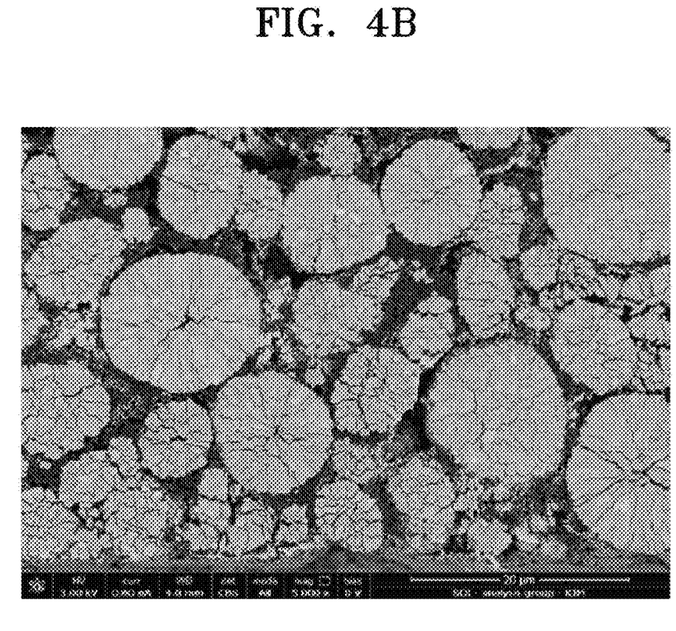
Figure 4C:
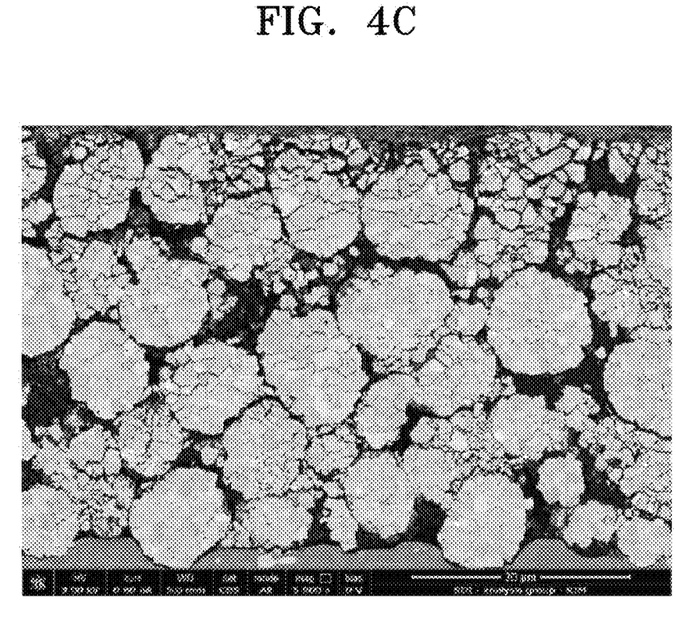

Lifespan characteristics are shown in Table 4 below and FIGS. 4A to 4C. FIGS. 4A to 4C are SEM images of cross-sections of the positive electrodes of coin cells manufactured according to Manufacture Example 1 and Comparative Manufacture Examples 1 and 2, respectively.

TABLE 4

|  | Lifespan (@50 times) (%) |
|---|---|
| Manufacture Example 1 | 98.7 |
| Manufacture Example 2 | 98.4 |
| Comparative Manufacture Example 1 | 90.1 |
| Comparative Manufacture Example 2 | 92.4 |
| Comparative Manufacture Example 3 | 95.1 |

Referring to Table 4, it was confirmed that the coin cells manufactured according to Manufacture Examples 1 and 2 had better lifespan characteristics than the coin cells manufactured according to Comparative Manufacture Examples 1 to 3. Thus, when the positive electrode including the Ni-based active materials according to Examples 1 and 2 which have closed pores only in the inner portion is utilized, occurrence of cracks is suppressed and lifespan characteristics at high temperatures are enhanced.

Referring to FIGS. 4A to 4C, it was confirmed that cracks are suppressed in the positive electrode of the coin cell according to Manufacture Example 1 in comparison with Comparative Manufacture Examples 1 and 2 after evaluating lifespan characteristics.

When the Ni-based active material for a lithium secondary battery according to an embodiment is utilized, occurrence of cracks may be suppressed during charging and discharging and the outer portion is densified so that side reactions with the electrolytic solution are suppressed at high temperatures. Therefore, a lithium secondary battery having improved lifespan characteristics may be manufactured.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various suitable changes in form and details may be made therein without departing from the spirit and scope as defined by the following claims, and equivalents thereof.

What is claimed is:

1. A nickel-based active material for a lithium secondary battery, the nickel-based active material comprising a porous inner portion having closed pores and an outer portion,
wherein the porous inner portion has a density less than that of the outer portion,
the nickel-based active material has a net density of 4.7 g/cc or less, and
wherein a volume of the porous inner portion is 20 to 35% based on a total volume of the nickel-based active material.

2. The nickel-based active material of claim 1, wherein a pore size of the closed pores is in a range of 150 nm to 1 μm in the porous inner portion.

3. The nickel-based active material of claim 1, wherein the porous inner portion has a porosity of 3 to 30%, and the porosity of the porous inner portion is 1.2 times or more greater than that of the outer portion.

4. The nickel-based active material of claim 1, wherein the outer portion has a radially arranged structure.

5. The nickel-based active material of claim 1, wherein the outer portion has a pore size of less than 150 nm.

6. The nickel-based active material of claim 1, wherein the nickel-based active material comprises plate particles, and
major axes of the plate particles are radially arranged.

7. The nickel-based active material of claim 6, wherein the plate particles have an average thickness of 100 nm to 200 nm, and an average length of 150 nm to 500 nm.

8. The nickel-based active material of claim 6, wherein the plate particles have a ratio of an average thickness to an average length of 1:2 to 1:10.

9. The nickel-based active material of claim 1, wherein the nickel-based active material comprises a compound represented by Formula 1 below:

$$Li_a(Ni_{1-x-y-z}Co_xMn_yM_z)O_2$$

wherein in Formula 1, M is an element selected from the group consisting of boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and
$0.95 \leq a \leq 1.3$, $x \leq (1-x-y-z)$, $y \leq (1-x-y-z)$, $0 < x < 1$, $0 \leq y < 1$, and $0 \leq z < 1$.

10. The nickel-based active material of claim 9, wherein in Formula 1, $1.0 \leq a \leq 1.3$, $0 < x \leq \frac{1}{3}$, $0 \leq y \leq 0.5$, $0 \leq z \leq 0.05$, and $\frac{1}{3} \leq (1-x-y-z) \leq 0.95$.

11. The nickel-based active material of claim 9, wherein the nickel-based active material comprises $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, and/or $LiNi_{0.85}Co_{0.1}Al_{0.05}O_2$.

12. A method of preparing a nickel-based active material for a lithium secondary battery, the method comprising:
mixing a lithium precursor and a metal hydroxide to form a mixture, and
conducting a primary heat treatment on the mixture under an oxidizing gas atmosphere at 600° C. to 800° C.,
wherein the nickel-based active material comprises a porous inner portion having closed pores and an outer portion,
the porous inner portion has a density less than that of the outer portion, and
the nickel-based active material has a net density of 4.7 g/cc or less, and
wherein a volume of the porous inner portion is 20 to 35% based on a total volume of the nickel-based active material.

13. The method of claim 12, further comprising conducting a secondary heat treatment on the mixture under an oxidizing gas atmosphere at 700° C. to 900° C. after the conducting of the primary heat treatment,
wherein the secondary heat treatment is conducted at a higher temperature than the primary heat treatment.

14. The method of claim 12, further comprising pretreating the mixture under an oxidizing gas atmosphere at 400° C. to 700° C. for 1 to 3 hours prior to the conducting of the primary heat treatment.

15. The method of claim 12, wherein the metal hydroxide comprises porous secondary particles comprising radially oriented primary particles.

16. The method of claim 12, wherein the metal hydroxide comprises a compound represented by Formula 2 below:

$$(Ni_{1-x-y-z}Co_xMn_yM_z)(OH)_2 \quad \text{Formula 2}$$

wherein in Formula 2, M is an element selected from the group consisting of boron (B), magnesium (Mg), calcium (Ca), strontium (Sr), barium (Ba), titanium (Ti), vanadium (V), chromium (Cr), iron (Fe), copper (Cu), zirconium (Zr), and aluminum, and $x \leq (1-x-y-z)$, $y \leq (1-x-y-z)$, $0 < x < 1$, $0 \leq y < 1$, and $0 \leq z < 1$.

17. A lithium secondary battery comprising a positive electrode comprising the nickel-based active material of claim 1, a negative electrode, and an electrolyte between the positive electrode and the negative electrode.

18. A nickel-based active material for a lithium secondary battery, the nickel-based active material comprising a porous inner portion having closed pores and an outer portion,
wherein the porous inner portion has a density less than that of the outer portion, and
the nickel-based active material has a net density of 4.7 g/cc or less,
wherein the nickel-based active material has a net density of 4.50 to 4.7 g/cc.

* * * * *